April 17, 1928.
H. P. ARNT
HOLLOW SPOKE END CONNECTION
Filed Sept. 26, 1921
1,666,615
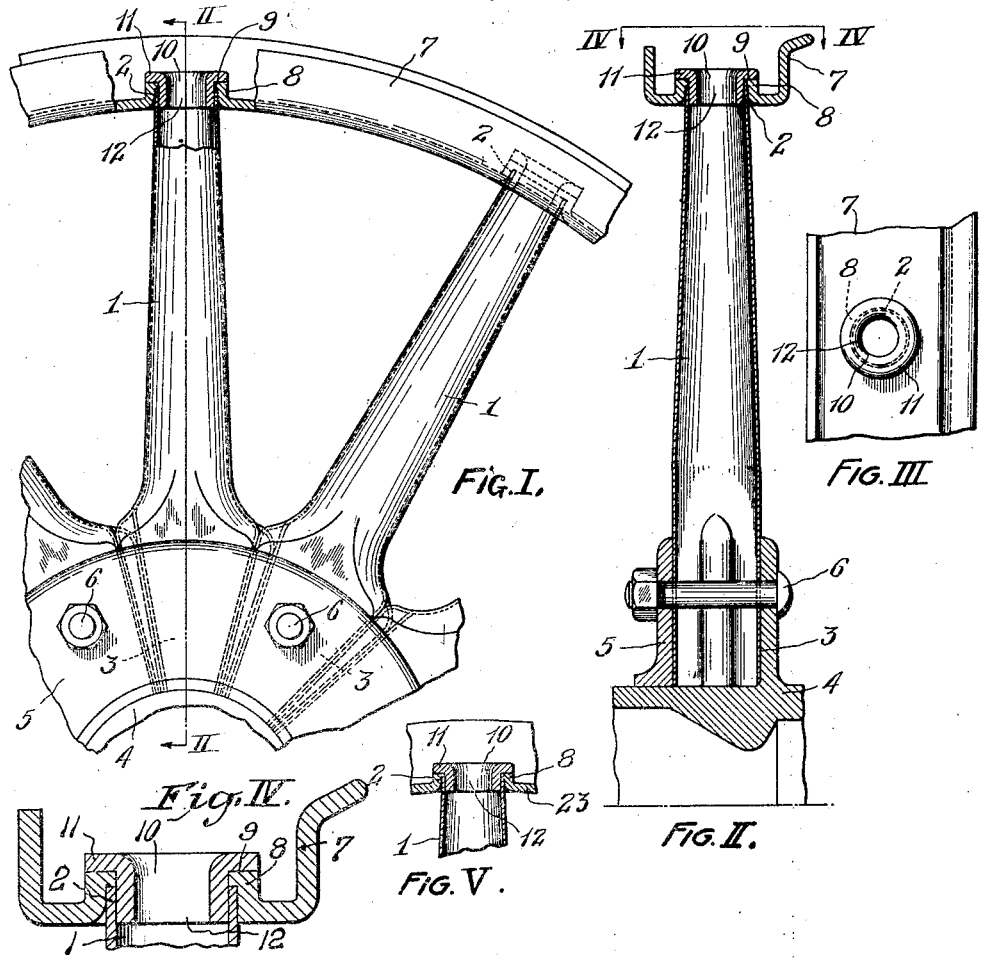
INVENTOR:
HERALD P. ARNT
BY HIS ATT'Y.

Patented Apr. 17, 1928.

1,666,615

UNITED STATES PATENT OFFICE.

HERALD P. ARNT, OF LAKEWOOD, OHIO, ASSIGNOR OF ONE-FOURTH TO CURT B. MULLER, OF CLEVELAND, OHIO.

HOLLOW-SPOKE END CONNECTION.

Application filed September 26, 1921. Serial No. 503,244.

My present invention relates to a wheel and more particularly to an all-metal wheel employing hollow spokes of the form and construction shown in my copending application filed June 23, 1921, Serial No. 479,787; the invention herein disclosed being the distinct manner of securing the type of spokes just referred to, to the felloe.

The preferred form of my invention shows the felloe fashioned interiorly with concentric depressions and projections, the depressions being adapted snugly to seat the outer ends of the spokes and the projections being adapted to be snugly enclosed each in an outer end of one of the spokes.

Referring to the drawings:

Figure I is an enlarged fragmentary side elevation showing the spoke and felloe connection, according to my invention, in section.

Figure II is a radial section on line II—II of Figure I.

Figure III is an end view of the spoke showing the adjacent felly portions.

Figure IV is an enlarged detail view of the spoke and felloe connection at the upper end of Figure II.

Figure V is a fragmentary detail view of a modified spoke and felloe connection.

Inasmuch as all of the spokes are connected in the same way at corresponding ends the singular number may be employed. A hollow spoke 1 having an outer end 2 has its nave end 3 of keystone form, that is to say, it abuts adjoining spokes along radial lines and preferably with a rabbeted connection as indicated by the dotted lines in Figure II and as is particularly shown described and claimed in my application entitled "wheel spoke interlock" filed of even date herewith. The nave end of the spoke 1 is carried between a flange on a hub 4 and a ring plate 5 which are secured together by a bolt and nut combination 6.

A felloe 7 preferably of steel channel construction is fashioned with an opening formed by depressing countersinking or punching the metal outwardly in such a manner as to form an annular outwardly projecting major flange 8 terminating in an annular minor flange 9 projecting at substantially right angles with respect to the direction of projection of the major flange 8. The diametrical dimension of the space across the interior surface of the flange 8 is made such as to correspond precisely with the exterior diameter of the outer end 2 of the spoke, and the distance of projection of the flange 9 is preferably the same as the thickness of the spoke end 2 as may be clearly observed upon inspection of Figure IV, whereby when the outer end of the spoke is inserted it may abut the flange 9 with flush interior surfaces. As an additional securing means, I provide a metal plug 10, hollow as the drawings exemplify, and provided with a flange 11 which abuts each of the felloe flanges 8 and 9. It will be observed that the inward extension 12 of the plug is adapted to have a telescopic fit within the end of the spoke 1 whereby the latter is reinforced there as well as exteriorly by the flange 8.

Figure V is a modification, like the preferred form with the omission from the felloe 23 of the minor flange 9, so that the outer edges of the flange 8 and spoke 1 lie flush and are both engaged by the flange 11 of the plug.

I claim:—

1. In a wheel, the combination of a felloe fashioned with openings and outwardly projecting major flanges at said openings, each flange being additionally fashioned with a minor flange projecting in turn at an angle relative to said major flange, hollow spokes having their outer ends fitted within said major flanges and their outer edges abutting said minor flanges, and plugs fitted in the outer ends of said spokes to wedge the latter against said major flanges.

2. In a wheel, the combination of a felloe fashioned with an opening and with an integral outwardly projecting major flange at said opening, the outer end of said flange being integrally formed with a minor flange projecting in a direction toward the center of said opening and a hollow spoke having its outer end fitted in said opening and having its outer edge abutting said minor flange.

3. In a wheel, the combination of a felloe having a hollow projection integral with a portion of its outer periphery and interiorly defined by two cylindrical surfaces of different diameter and by an annular surface intersecting both of said cylindrical surfaces, a tubular spoke fitted in said projection to abut said annular surface and also the larger one of said cylindrical surfaces and a plug in the felloe-inserted portion of the spoke and abutting the smaller one of said cylindrical surfaces of said projection and also abutting the interior surface of the spoke.

Signed by me, this 31st day of August, 1921.

HERALD P. ARNT.